(12) United States Patent
Takahashi et al.

(10) Patent No.: US 7,278,767 B2
(45) Date of Patent: Oct. 9, 2007

(54) DOOR MIRROR EQUIPPED WITH LAMP BODY

(75) Inventors: Yoshihiro Takahashi, Kiryu (JP); Yosuke Fukasawa, Kiryu (JP); Motosuke Ishizawa, Kiryu (JP); Takao Umezawa, Ota (JP)

(73) Assignee: Mitsuba Corporation, Kiryu (JP)

( * ) Notice: Subject to any disclaimer, the term of this patent is extended or adjusted under 35 U.S.C. 154(b) by 66 days.

(21) Appl. No.: 10/525,243

(22) PCT Filed: Mar. 22, 2004

(86) PCT No.: PCT/JP2004/003891

§ 371 (c)(1),
(2), (4) Date: Feb. 22, 2005

(87) PCT Pub. No.: WO2004/085205

PCT Pub. Date: Oct. 7, 2004

(65) Prior Publication Data

US 2005/0276057 A1    Dec. 15, 2005

(30) Foreign Application Priority Data

Mar. 25, 2003  (JP)  ............................. 2003-082806

(51) Int. Cl.
*B60Q 1/26* (2006.01)
*B60Q 1/00* (2006.01)
*B60R 1/12* (2006.01)

(52) U.S. Cl. ...................................... 362/494; 362/501
(58) Field of Classification Search ................ 362/494, 362/501
See application file for complete search history.

(56) References Cited

U.S. PATENT DOCUMENTS

| 5,303,130 | A | * | 4/1994 | Wei et al. ................... 362/494 |
| 5,660,457 | A | * | 8/1997 | Lyons ........................ 362/494 |
| 5,863,116 | A |   | 1/1999 | Pastrick et al. |
| 5,892,438 | A | * | 4/1999 | Vaughn ..................... 340/468 |
| 6,086,229 | A |   | 7/2000 | Pastrick |
| 6,099,153 | A |   | 8/2000 | Zimmermann et al. |
| 6,139,171 | A |   | 10/2000 | Waldmann |
| 6,176,602 | B1 |  | 1/2001 | Pastrick et al. |
| 6,227,689 | B1 | * | 5/2001 | Miller ........................ 362/494 |
| 6,250,783 | B1 | * | 6/2001 | Stidham et al. ............. 362/494 |
| 6,250,784 | B1 | * | 6/2001 | Kayama ..................... 362/494 |

(Continued)

FOREIGN PATENT DOCUMENTS

JP          A 9-263179          10/1997

(Continued)

*Primary Examiner*—Jong-Suk (James) Lee
*Assistant Examiner*—David J Makiya
(74) *Attorney, Agent, or Firm*—Oliff & Berridge, PLC

(57) ABSTRACT

A door mirror comprising a mirror portion and a side blinker which is one example of lamp bodies allows easily performed maintenance for the side blinker. A second opening is formed on the back side of a mirror housing with fixing pieces formed on the second opening. A lamp unit integrates a lens portion with the back face of a base body having an inner base and an outer base which covers the front face of the inner base. The lamp unit is inserted into the second opening through the back face side of the mirror housing, and fixing pieces of the lamp unit and the mirror housing-fixing pieces are tightened by screws.

3 Claims, 12 Drawing Sheets

U.S. PATENT DOCUMENTS

| | | | |
|---|---|---|---|
| 6,325,517 B1 * | 12/2001 | Kuo | 359/838 |
| 6,517,227 B2 | 2/2003 | Stidham et al. | |
| 6,561,685 B2 * | 5/2003 | Weber et al. | 362/494 |
| 6,582,109 B2 * | 6/2003 | Miller | 362/494 |
| 6,749,325 B2 * | 6/2004 | Bukosky et al. | 362/494 |
| 6,769,798 B2 * | 8/2004 | Mishimagi | 362/522 |
| 6,832,848 B2 | 12/2004 | Pastrick | |
| 6,880,960 B2 * | 4/2005 | Mishimagi | 362/522 |
| 6,897,614 B2 * | 5/2005 | Matsumoto et al. | 315/84 |
| 6,926,432 B2 * | 8/2005 | Rodriguez Barros et al. | 362/494 |
| 2001/0030872 A1 * | 10/2001 | Sakamoto et al. | 362/494 |
| 2005/0047160 A1 * | 3/2005 | Evans | 362/494 |

FOREIGN PATENT DOCUMENTS

| | | |
|---|---|---|
| JP | A 2002-079878 | 3/2002 |
| JP | A 2002-337606 | 11/2002 |

* cited by examiner

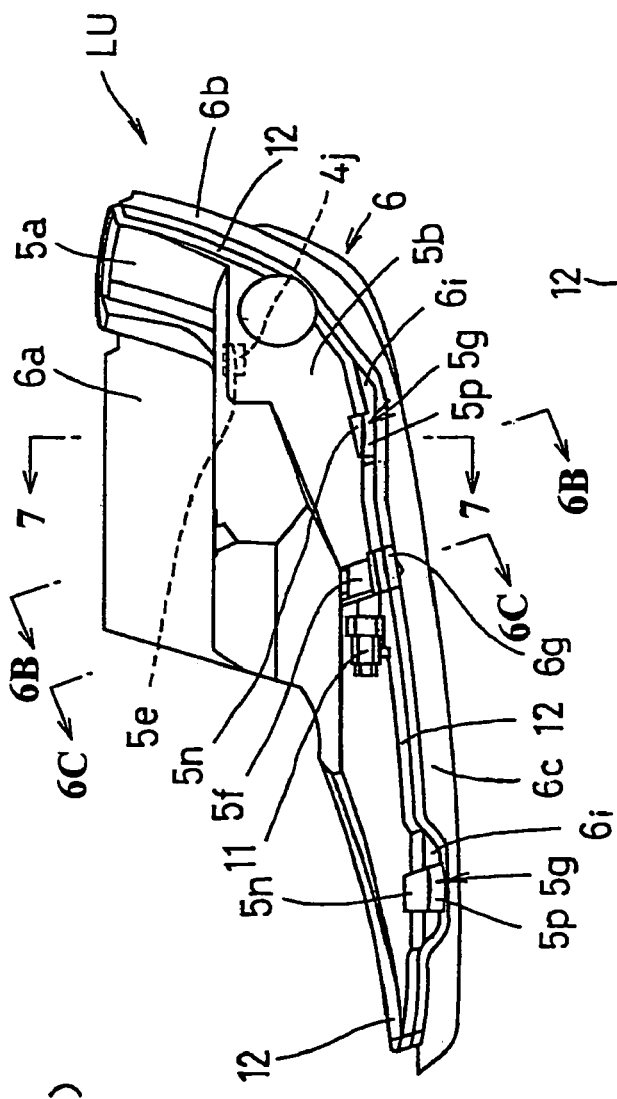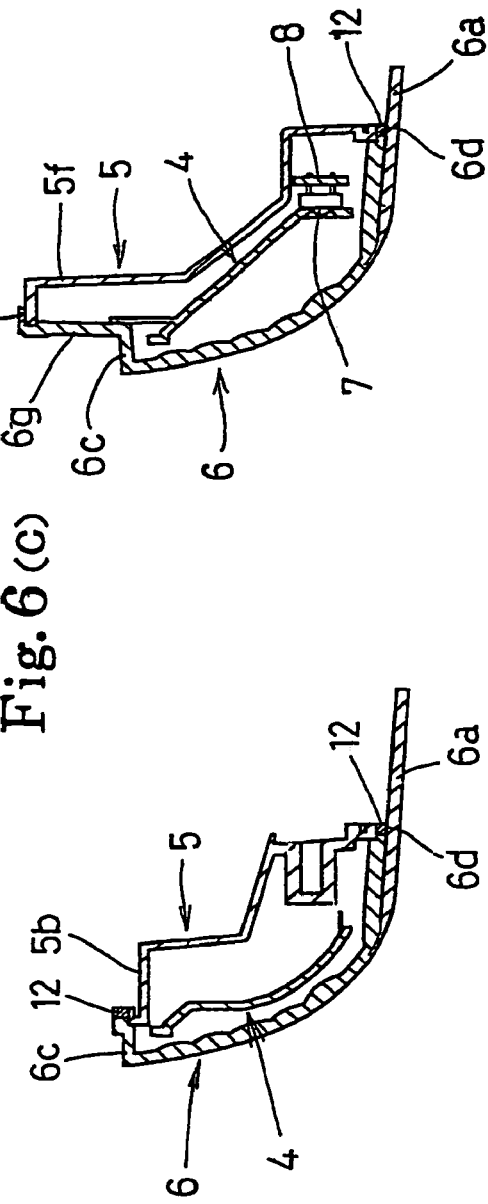
Fig. 6 (A)
Fig. 6 (B)
Fig. 6 (C)

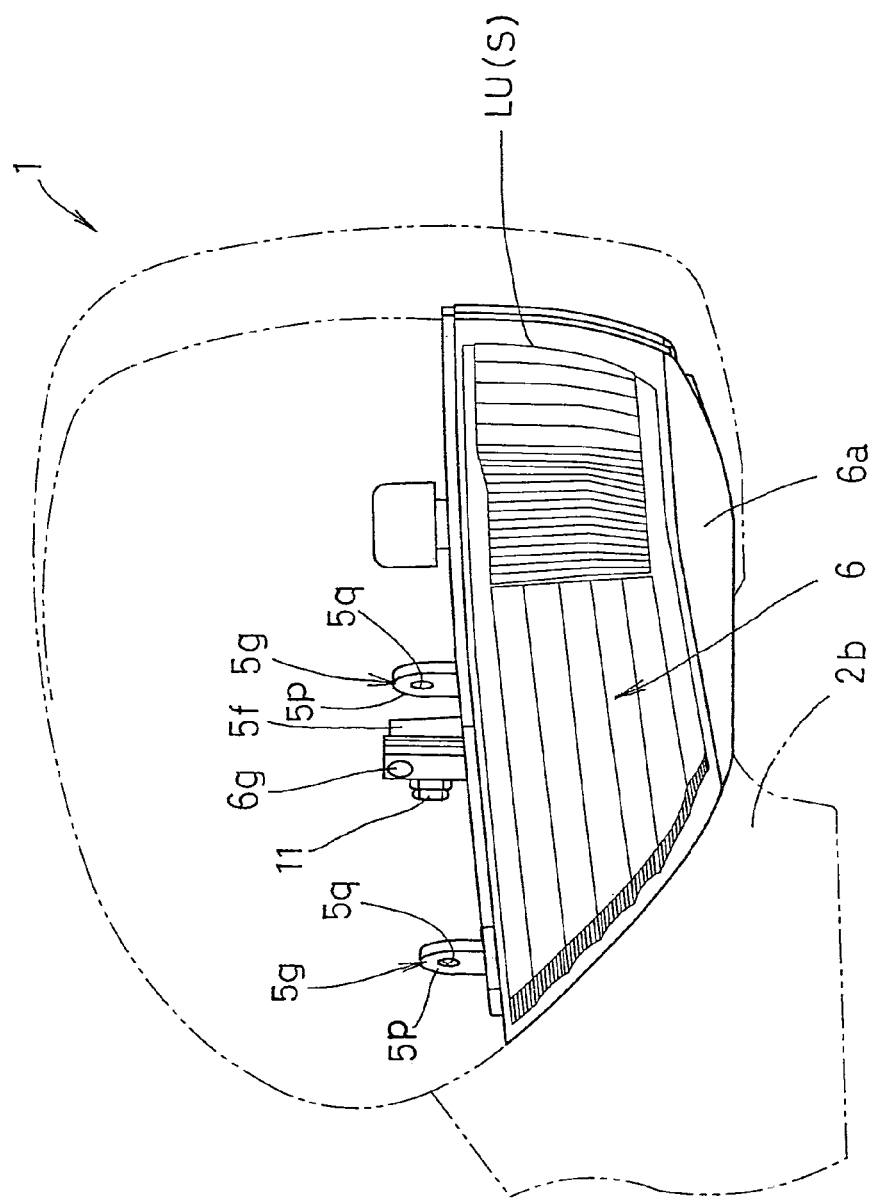

DOOR MIRROR EQUIPPED WITH LAMP BODY

This application is the U.S. National Stage of PCT/JP2004/003891 filed Mar. 22, 2004 which claims priority from JP 2003-082806 filed Mar. 5, 2003, the disclosures of which are incorporated in their entireties herein.

TECHNICAL FIELD

The disclosure relates to the technical field of a door mirror equipped with a lamp body to be mounted on the door of an automobile.

BACKGROUND TECHNOLOGY

In general, some door mirrors of this type are known as those into which a lamp body, such as a side blinker (a side-turn-lamp), has been assembled. And, in this kind of door mirror, when a lamp body is applied to a side blinker and the side blinker is inserted into the projecting outer end side of a door mirror laterally protruded from the side of an automobile a favorable blinker fixing point is secured because visibility is improved for passengers.

Proposed as such a door mirror is, for example, a door mirror wherein boards having light sources are fixed to a base, a lens covering this base is integrated to form a side blinker portion. The side blinker portion is attached to an opening formed on a door mirror housing, which is a body of the door mirror (for example, refer to JP-A No. 2002-79878).

In the door mirror claimed in the above-described JP-A-2002-079878, the side blinker portion, which is to be provided in the housing of the door mirror in such a state that it is positioned on the back-face side of the mirror portion, is assembled thereinto from the side where the mirror portion is disposed (from the front-face side), and the side blinker is structured so as to be fixed to the door mirror housing by engaging an outer peripheral edge portion of the side blinker with a marginal opening portion provided on the door mirror housing and by screwing fixing pieces disposed on the mirror portion side of the side blinker portion onto support portions of the door mirror housing.

SUMMARY

Therefore, the side blinker portion must be assembled before assembly of the mirror portion. Such a structure makes it necessary to remove the mirror portion before removal of the side blinker portion when only the side blinker is replaced due to lamp burnout or breakage of the light source(s) of the side blinker. Therefore, each replacement of a side blinker is troublesome and complicated, resulting in poor maintenance performance. Therein exist the problems to be solved.

This door mirror assembly has been made to solve these problems in view of the circumstances as described above, and in a door mirror formed comprising a mirror portion and the lamp body provided in a housing, the lamp body is incorporated into the housing in a direction opposite to the mirror portion, and a fixing portion for fixing the lamp body to the housing is covered with a cover which is formed separately from the lamp body and covers the housing.

And thereby, it becomes possible to remove the lamp body without removing the mirror portion from the housing as a result that the fixing portions are exposed when removing the cover from the housing. Thus workability during maintenance is increased.

In the door mirror, the lamp body is structured to be a lamp unit by integrating a lens portion covering the back face of an inner base into a base body having an inner base exposing a light source through its back face and an outer base covering the front face of the inner base and incorporating a board supplying power to the light source between the outer base and the inner base, and the base body and the lens portion are integrated by an injected resin material.

Thus, the lamp body has excellent waterproofing and design characteristics, and at the time of attachment to the housing, the lamp body can be easily attached without giving consideration to water proofing and other similar characteristics or issues.

Furthermore, in the door mirror, the lamp body of the invention can be fixed to the housing via fixing pieces mounted on the base body, thus making it possible to prevent light leakage at the lamp body. Furthermore, in the door mirror, the cover is provided approximately flush with the lens portion of the lamp body, thus making it possible to further improve the design characteristics.

BRIEF DESCRIPTION OF DRAWINGS

The invention will be described with reference to the drawings in which:

FIGS. 6(A), 6(B) and 6(C) are respectively a plan view of the lamp unit, 6B-6B cross-sectional view and 6C-6C cross-sectional view of FIG. 6(A);

FIG. 10 is a perspective view of the door mirror;

DETAILED DESCRIPTION OF PREFERRED EMBODIMENT

An exemplary embodiment will be described on the basis of the drawings given in FIGS. 1 through 12.

Figure 1:
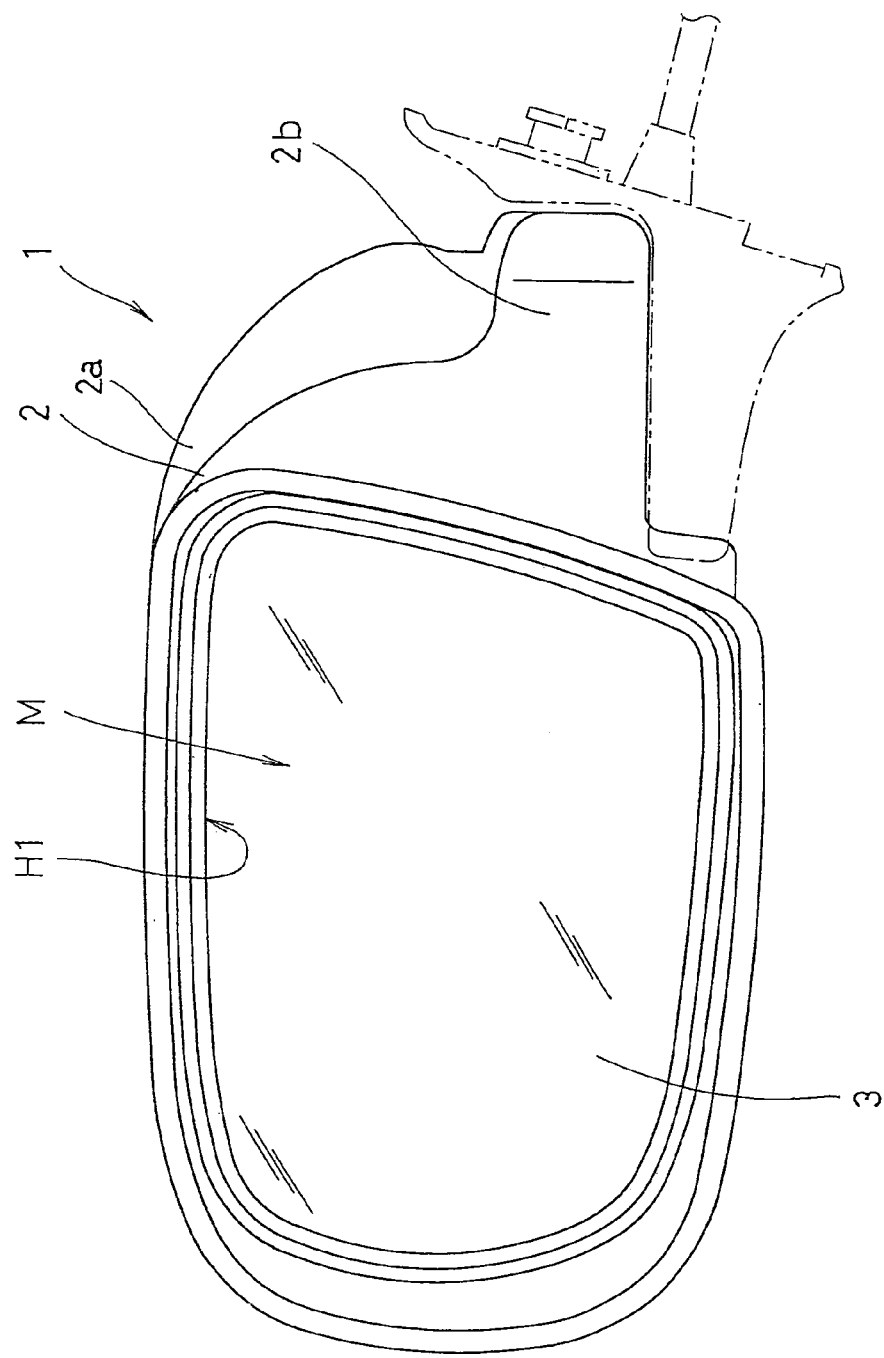
FIG. 1 is a front view of a door mirror.

In the drawings, 1 represents a pair of left and right door mirrors mounted on the driver's door and on the passenger's door in a passenger vehicle, and these door mirrors 1 are formed in a linear symmetrical state. The door mirror 1 illustrated in FIG. 1 represents a front (forward looking) view of a door mirror mounted on the passenger's door of an automobile with a right-hand steering wheel when being viewed from behind. The door mirror 1, as in the present embodiment, is provided with, together with a mirror portion M for a driver's rear view confirmation, a side blinker portion S (FIG. 2) (a direction indicator), which is provided at the lower half of the back face side of the mirror M, for indicating a driving direction of a vehicle by lighting of its horizontally protruding end portion (an external-end portion).

A mirror housing 2 (a door mirror housing which corresponds to the housing of the disclosure) of the door mirror 1 is integrally molded with a resin material to provide a configuration of a curved container having a first opening H1 formed on its front face (surface) and having a swelling portion 2a swelling backward. And, in the first opening H1 on the front face, are disposed a mirror 3 of the mirror portion M and a mirror driving mechanism 3a (FIG. 12) mounted on the back face of the mirror 3, for automatically carrying out three-dimensional position control of the mirror 3. Furthermore, the swelling portion 2a on the back face of the mirror housing 2 is provided with a second opening H2 positioned at its lower side part, and into this second opening H2, the side blinker S is assembled.

Moreover, a door mirror retractable mechanism (not shown) is incorporated in a door-side end portion 2b (a base-end portion) of the mirror housing 2, and the mirror 3 automatically changes its posture by turning, within a present angle range, between a practical using posture in which the mirror 3 faces backward and protrudes outwardly and a retracted posture in which the mirror 3 lies along the door on the basis of a drive of the door mirror retractable mechanism driven by a switch operation.

Herein, the side blinker portion S is composed of a lamp unit LU where the exemplary embodiment is carried out, and comprises an inner base 4, an outer base 5 (FIG. 5(B)), and a lens portion 6. The lamp unit LU is of a shape to be incorporated into a part extending from a door mounting side (base-end side) of the-lower half of the mirror housing 2 to the end portion (front-end portion) protruded outwardly, is horizontally elongated, and swells toward the back-face side. Further, the lamp unit LU is provided with, at its protruding front-end part, a side-face portion curved from the back-face side to the front-face side and, at the base-end side part of the door mounting side, a slant portion where a lower edge is slanted to an upper edge so that the shape is tapered toward the base-end side.

Next, a description will be given of an inner base 4 of the lamp unit LU. The inner base 4 is integrally injection-molded through injection molding by using a light-impermeable resin material (a non-translucent resin material), wherein at a part corresponding to the protruding front-end portion, which is an end portion of the horizontally elongated body, a side-face portion 4a (FIG. 3) is formed by bending from the back face side to the front face side, and the horizontally elongated face portion is provided with a swelling and protruding portion 4b swelling in a triangular shape toward the back-face side, with the lower-end portion used as a base, at three places. Faces at the total of four places, namely, two lower-end faces located between these swelling and protruding portions 4b, an external-side face (front-end side) of the swelling and protruding portion 4b located at the center and the side-face portion 4a, are respectively facing in three-dimensionally different directions, and these faces are respectively structured as light source-attaching surfaces 4c (FIG. 9(A)). The light source-attaching surfaces 4c are individually provided with through-holes 4d in an appropriate number, so that respective front-end portions of light sources 7 (to be described later) are seen from the through-holes 4d and the light sources 7 are exposed to the back faces through the through-holes 4d. In addition, the back face of the inner base 4 is covered with an aluminum coating, whereby the back face of the inner base 4 functions as a reflector for the light sources 7, which are exposed to the back-face side through the respective through-holes 4d.

On the other hand, the base-end portion of the light source 7, composed of a light-emitting diode, is mounted on a printed circuit board (hereinafter referred to as a board) 8 with wiring necessary for the emission of the light source 7. A different board 8 is individually provided for the light source(s) 7 mounted on each light source-attaching face 4c, that is, four boards 8 are provided in the exemplary embodiment. These four units of the board 8 are to be disposed on the front-face side of the inner base 4, and the respective boards 8 are, by being respectively assembled along their corresponding light source-attaching faces 4c, disposed on the inner base 4 in a condition where they are facing in three-dimensionally different directions. Moreover, power is supplied to the respective boards 8 facing in the different directions through a plurality of terminal strips 9 for connection between the boards 8, and the terminal strips 9 are formed by, for example, appropriately bending strips so as to follow the front face configuration of the inner base 4.

Herein, in the present embodiment, a plurality of boards 8, to which the light sources 7 are connected, are connected in advance via the terminal strips 9 bent according to the disposing places of the respective boards 8, and are thereby structured as a light source unit BU. The light source unit BU is assembled into the inner base 4. In the vicinity of the surface of each light source-attaching face 4c of the inner base 4 are a plurality of engaging claws 4e for engaging the boards 8. The engaging claws 4e, with protruding front ends, are formed in a protruding state in a direction approximately orthogonal to the respective light source attaching faces 4c. By engaging appropriate points, according to the shape of the respective board 8, with these respective engaging claws 4e, the boards 8 are fixed and supported while a designated gap exists between the boards 8 and the light source-attaching faces 4c. Furthermore, the inner base 4 is provided with a plurality of engaging pieces 4f for supporting the terminal strips 9, which are provided in a protruding fashion so as to follow the board faces of the terminal strips 9. Thereby, when the light source unit BU is assembled into the inner base 4, the terminal strips 9 are supported by the engaging pieces 4f and the boards 8 are fixed and supported by the engaging claws 4e, whereby an assembling condition of the light source unit BU into the inner base 4 is assuredly fixed.

In addition, of the above-described four boards 8, an arbitrary board 8a functions as a main board and the main board 8a is connected with necessary control components and lead wire 10 for connection with external power supply, in addition to the light source 7. The above-described terminal strips 9 individually connect the other boards 8 with the main board 8a. In the present embodiment, the lead wire 10, extending from the above-described main board 8a, is supported by the lead wire induction strip 4g formed on the inner base 4, so that the lead wire 10 is drawn out above the inner base 4. Further, 11 represents a coupler which is mounted on the front-end portion for drawing out the above-described lead wire 10 and is jointed with an external coupler 14 (FIG. 12) from an external power supply.

On the other hand, the above-described outer base 5 is molded as one piece through injection molding by using a light impermeable resin material (non-translucent resin material). The outer base 5 has a shape of covering the front face side of the inner base 4. At one end portion (at the front-end portion) of the horizontally elongated body, a side face portion 5a is formed by bending from the back face side to the front face side, and at an upper edge portion thereof, an upper piece portion 5b protruding to the back face is formed.

The end face on the back side which composes the outer base upper piece portion 5b is provided at two places in the horizontal direction with abutting piece portions 5c which are formed stepwise due to cutting on the plate thickness of the outer base 5. Furthermore, the back face of the outer base 5 is provided at three places with positioning protrusions 5d located at the slant portion on the base-end portion side and protruding toward the back face. The outer base 5 is also provided with a positioning concave 5e located at the lower edge adjacent to the side face portion 5a and regressed to the front face.

In contrast, the abutting receiving-piece portion 4h, corresponding to the retention piece, is formed in a state of protruding upward from the upper edge of the inner base 4 covered with the outer base 5. As will be described later, the abutting receiving-piece portion 4h is abutted both on the front and back faces by the abutting piece portion 5c of the outer base 5 and the lens portion 6, respectively, and installed to be held between them. Furthermore, the back face of the inner base 4 is provided with positioning concaves 4i located at the slant portion of the door assembly side and joined with a corresponding one of the above-described positioning protrusions 5d. A positioning protrusion 4j is also provided, which is located at the lower edge adjacent to the side face portion 4a, protruded to the front face and joined with the positioning concave 5e.

While the front face side of the abutting receiving-piece portion 4h is abutted against the inner abutting portion 5r which is a lower part of the stepwise abutting piece portion 5c, the positioning protrusions 5d, on the front face side of the abutting receiving-piece portion 4h, are fitted into the positioning concaves 4i, and the inner base 4 and outer base 5 are incorporated in a condition where the positioning protrusion 4j is fitted into the positioning concave 5e. Thus, the bases 4, 5 are respectively assembled in a positioned state and in a temporarily secured state. In the above-described assembled state, a space portion is formed between the inner base 4 and the outer base 5, and the above-described light source unit BU is accommodated into the space portion so that the boards 8 and the terminal strips 9 are not exposed to the outside of the bases 4, 5. In addition, the circumferential portion of the outer base 5 protrudes outwardly further than the circumferential portion of the inner base 4, and only the inner base abutting receiving-piece portion 4h is brought into contact against the upper face portion 5b of the outer base 5 in an anteroposteriorly laminated fashion.

The upper face portion 5b of the outer base 5 is provided with a coupler supporting piece 5f for drawing out the lead wire 10 directed to the upper edge side by the lead wire induction piece 4g of the inner base 4. The coupler supporting piece 5f is located between the above-described pair of abutting piece portions 5c and installed to accommodate the front end of the above-described lead wire 10 and the base-end portion of the coupler 11 connected with the front-end portion.

On the upper face portion 5b of the outer base, fixing pieces 5g are formed in a protruded manner to continue upwardly from the above-described pair of abutting receiving-piece portions 5c. The pair of fixing pieces 5g are respectively provided with a protruding base-end piece 5m erected upwardly from a front-face side part separated from the back-face end portion of the upper piece portion 5b, which is a lens joining edge of the outer base 5; a bent piece 5n extends from the front edge of the protruding base-end piece 5m to the back face side, which is a lens joining edge side; and an erected piece 5p extending from the front edge of the bent piece 5n upward in an erecting fashion, and is formed in a crank shape. Therefore, the mounting erected piece 5p for mounting the lamp unit LU on the mirror bracket 2 is lopsided to the lens joining edge side from the protruding base-end piece 5m and results in a positional relationship located above the lens joining edge. The fixing pieces 5g are provided with a rectangular space which is surrounded by the upper piece portion 5b, a protruding base-end piece 5m, and a bent piece 5n, is equipped with an opening on the back face, and as will be described later, the space serves as a flow path where an injection resin material 12 is filled in injection molding for integrating the base body with the lens 6. Further, 5q is a mounting hole provided in the erected piece 5p.

On the other hand, the lens portion 6 is integrally molded through injection molding by using a light permeable resin (translucent resin or transparent resin), excepting its lower face portion 6a. The lower face portion 6a is molded with a non-translucent resin material, and is provided with a side face portion 6b formed by bending to the protruding front end and an upper face portion 6c protruded from the upper edge portion to the front face side. The above-described lower face portion 6a extends to the front face side over assembly parts of the inner base 4 with the outer base 5, but is located at a portion along the lower edge of the outer base 5, and a flow path 6d is formed stepwise so that the molding resin material 12 due to injection can inflow.

Furthermore, on the upper face portion 6c of the lens portion 6, a coupler supporting piece 6g for constructing a coupler support along with a coupler supporting piece 5f formed on the outer base 5 is formed in an upwardly protruding fashion. The coupler supporting piece 6g of the lens portion serves as an injection incoming port for injection molding of the lens portion 6, thus making it possible to prevent the part for permeating the light source 7 of the lens portion 6 from being damaged due to traces on the injection incoming port.

Figure 7:
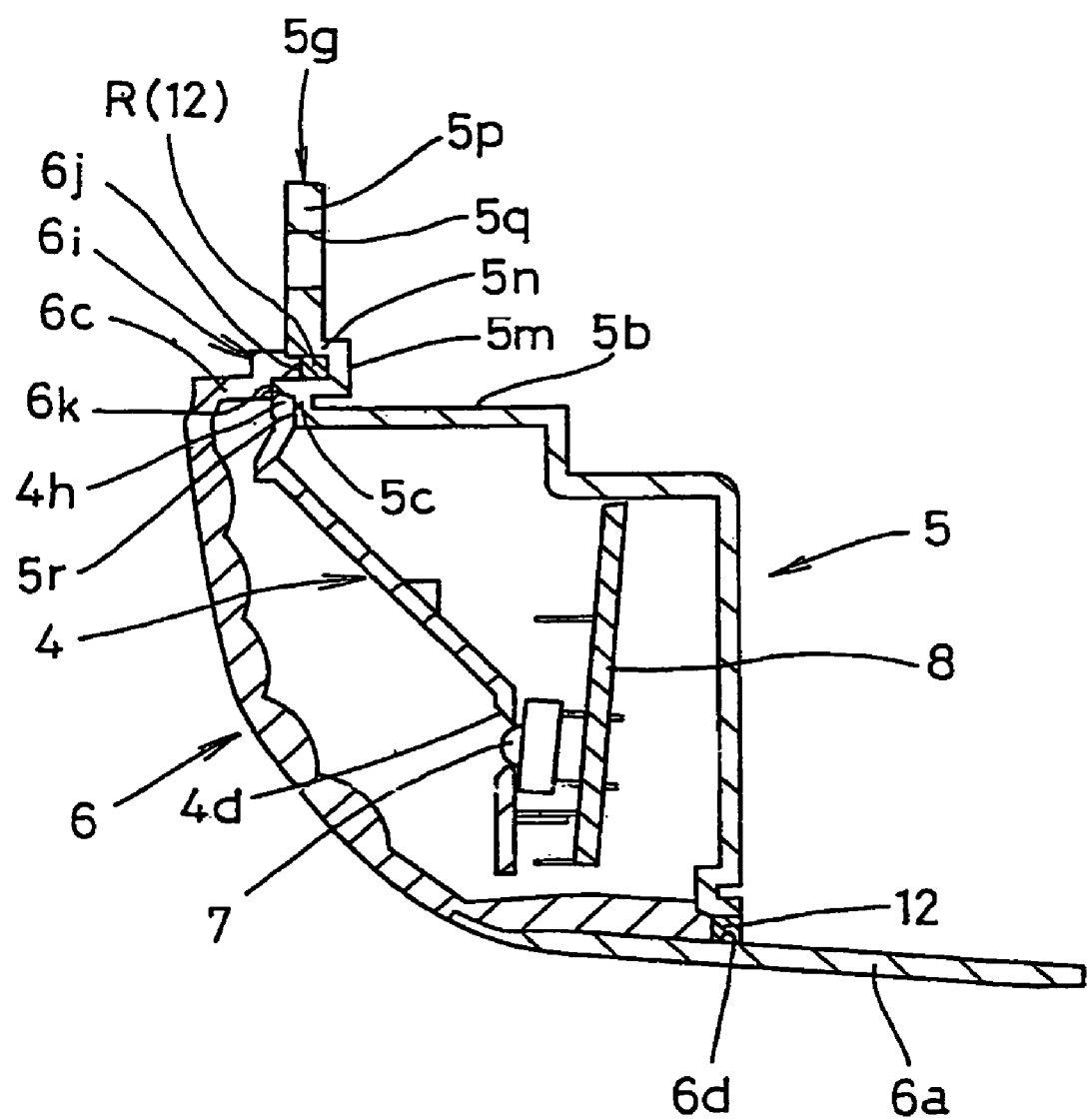
FIG. 7 is an 7-7 cross sectional view of FIG. 6(A)
Figure 8A:
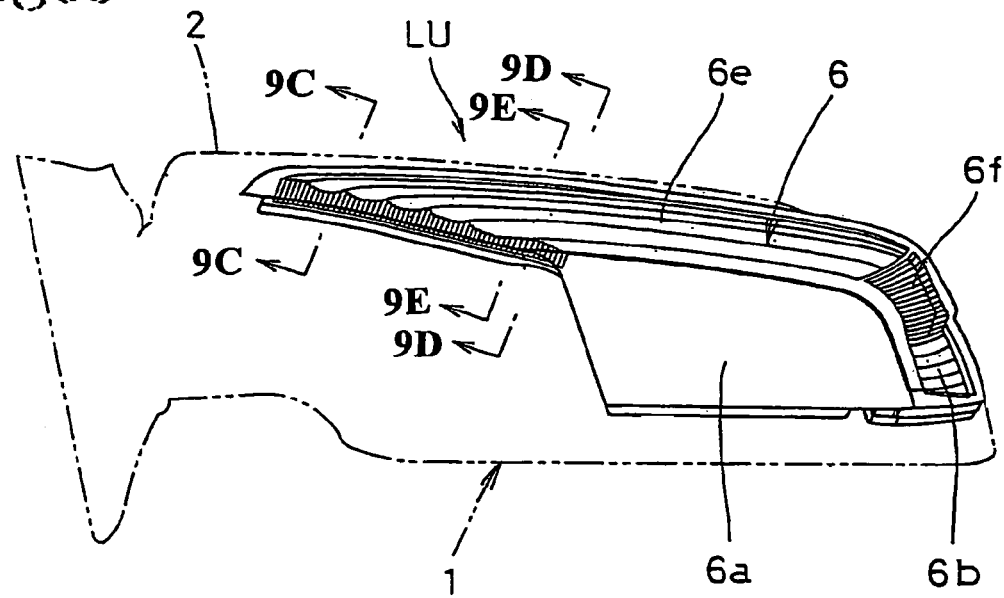
FIGS. 8(A) and 8(B) are respectively a bottom plan view of the lamp unit and a partially enlarged perspective view for explaining the upper edge portion of the lamp unit.
Figure 8B:
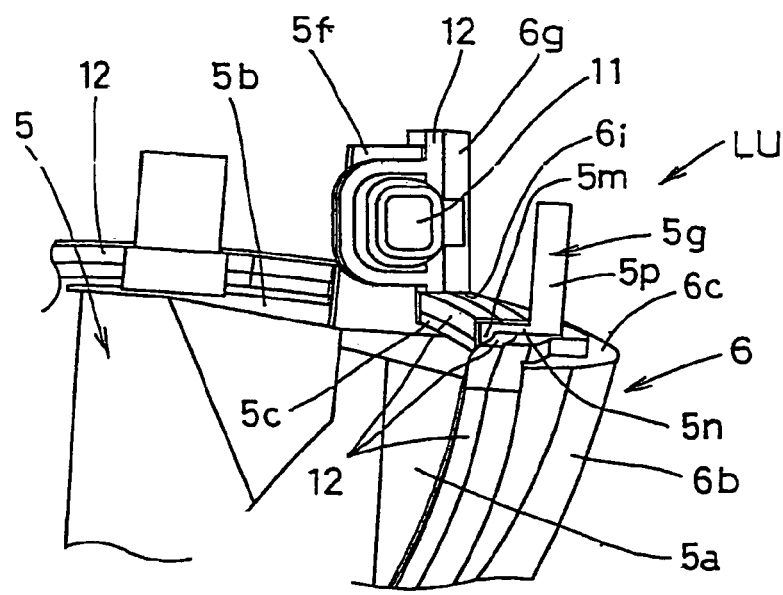
Figure 9A:
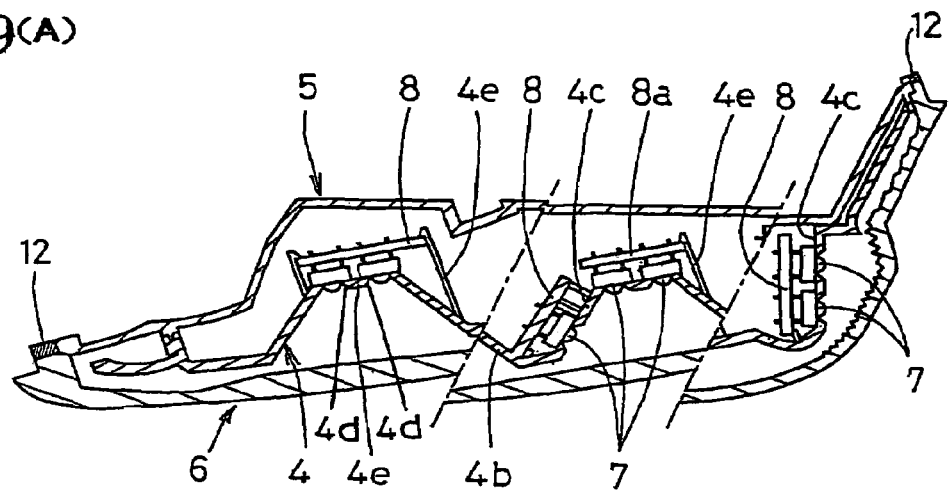
FIGS. 9(A), 9(B), 9(C), 9(D) and 9(E) are respectively an 9A-9A cross-sectional view and 9B-9B cross-sectional view of FIG. 5(A) and an 9C-9C cross-sectional view, 9D-9D cross-sectional view and 9E-9E cross-sectional view of FIG. 8(A)
Figure 9B:
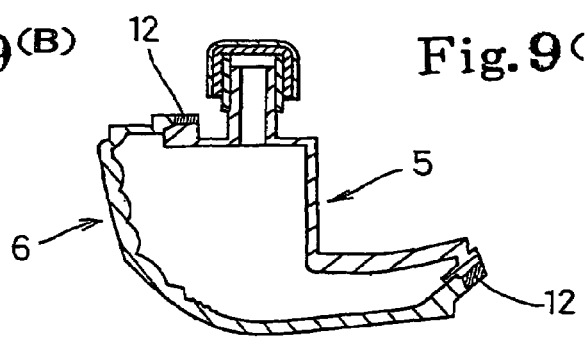
Figure 9C:
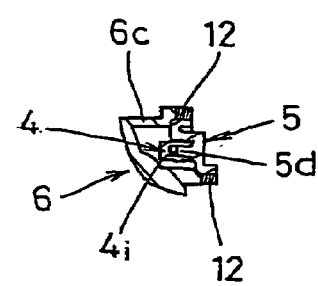
Figure 9D:
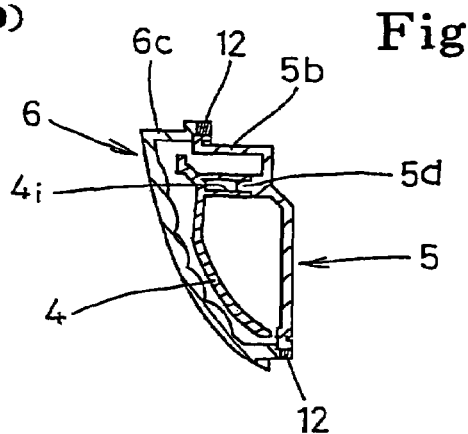
Figure 9E:
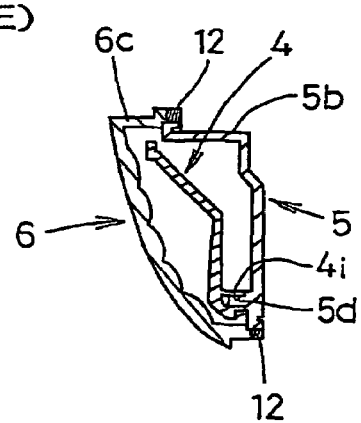

The upper face portion 6c of the lens portion 6 is also provided with abutting piece portions 6i opposed to the abutting piece portions 5c of the outer base 5 (FIG. 7). The lens abutting piece portion 6i is a portion where the outer abutting piece portion 6j is fitted in the end portion on the back side of the space R of the fixing piece 5g formed at the outer base abutting piece portion 5c and the inner abutting portion 6k abutted against the back face of the upper edge portion of the inner base abutting receiving-piece portion 4h are formed in a stepwise state. When the lens portion 6 and the base body are mated with each other, the inner abutting portion 6k is abutted against the inner base abutting receiving-piece portion 4h in a pressed manner, while the inner abutting portion 6k makes the outer abutting portion 6j of the lens abutting piece portion 6i and the protrusion base-end piece 5m of the fixing piece 5g are opposed to one another with a space therebetween. The opposing space is provided as a space portion R.

When the lens portion 6 is set in a mated state so as to cover the back face of the inner base 4 incorporated in advance with the outer base 5 for temporary retention, the peripheral edge portion (lens joining edge of the base body) of the outer base 5 which protrudes further outwardly than the periphery of the inner base 4 is abutted against the portion which is located further inwardly than the outer edge of the upper face portion 6c and the outer edge of the lower edge portion of the slant portion of the lens portion 6 (base body joining edge of the lens portion). A stepwise part, formed between the peripheral edge of the outer base 5 and peripheral edge of the lens portion 6 thus abutted, serves as a flow path for the injection resin material 12. The resin material 12, which is a non-translucent resin material, is injected into all flow paths around the circumference of the lamp unit LU. The flow paths are composed of the flow path provided on the circumference and a flow path 6*d* provided on the lower face portion 6*a* so as to unify the lens portion 6 with the base body composed of the inner base 4 and outer base 5.

Furthermore, at this time, the coupler supporting piece 5*f* on the outer base side is abutted against the coupler supporting piece 6*g* on the lens portion side (FIG. 10), and the resin 12, which is injected for integrating the circumference of the base body with the lens portion 6, is filled into this part as well, thus simultaneously attaining an integration of the lens portion 6 with the base body at the part of the coupler supporting pieces 5*f*, 6*g*.

As mentioned above, during injection of the resin 12, at the part of the fixing piece 5*g*, the lens portion 6 is mated with the base body, whereby the opening back face of the above-described space R is opposed to the outer abutting portion 6*j* of the abutting receiving piece portion 6*i* of the lens portion 6. The space R communicates with the stepwise flow path formed between the outer circumferential edge of the lens portion 6 and that of the outer base 5. Thereby, the resin material 12 injected around the whole circumference is filled into the above-described space R as well, and the lens portion 6 and the base body is sealed by the injection of the resin material, although the fixing pieces 5*g* (erected pieces 5*p*) for mounting the lamp unit LU are provided on the end portion (lens joining edge) on the back side of the upper face portion 5*b* of the outer base.

As described above, integration of the lens portion 6 with the base body by injection molding can be used not only for an integration at the part of the coupler supporting pieces 5*f*, 6*g* but also for an integration at the part for forming the fixing pieces 5*g* protruded outwardly from the outer base 5, whereby a one time injection molding can seal the entire circumference of the lamp unit LU and higher water proofing performance is obtained.

Furthermore, in the above integration process, the abutting receiving-piece portion 4*h* of the inner base 4 is sandwiched in a pressed manner between the inner abutting portion 5*r* of the abutting piece portion 5*c* of the outer base 5 and the inner abutting portion 6*k* of the abutting piece portion 6*i* formed at the end face on the front face of the lens upper face portion 6*c*. In this condition, by integrating the outer base 5 and the lens portion 6 using the resin material 12, a condition where the abutting receiving-piece portion 4*h* is temporally retained by the outer base 5 can be changed to a fixed condition where the same is sandwiched between the outer base 5 and lens portion 6.

Moreover, on the front face of a part opposed to the light source 7 in the lens portion 6, horizontally elongated and protruded strips 6*e* and vertically elongated and protruded strips 6*f* are formed. The side face portion 6*b*-forming part is protruded outwardly, whereby light from the light sources 7 can be dispersed in multiple directions to increase the visibility.

Figure 11:
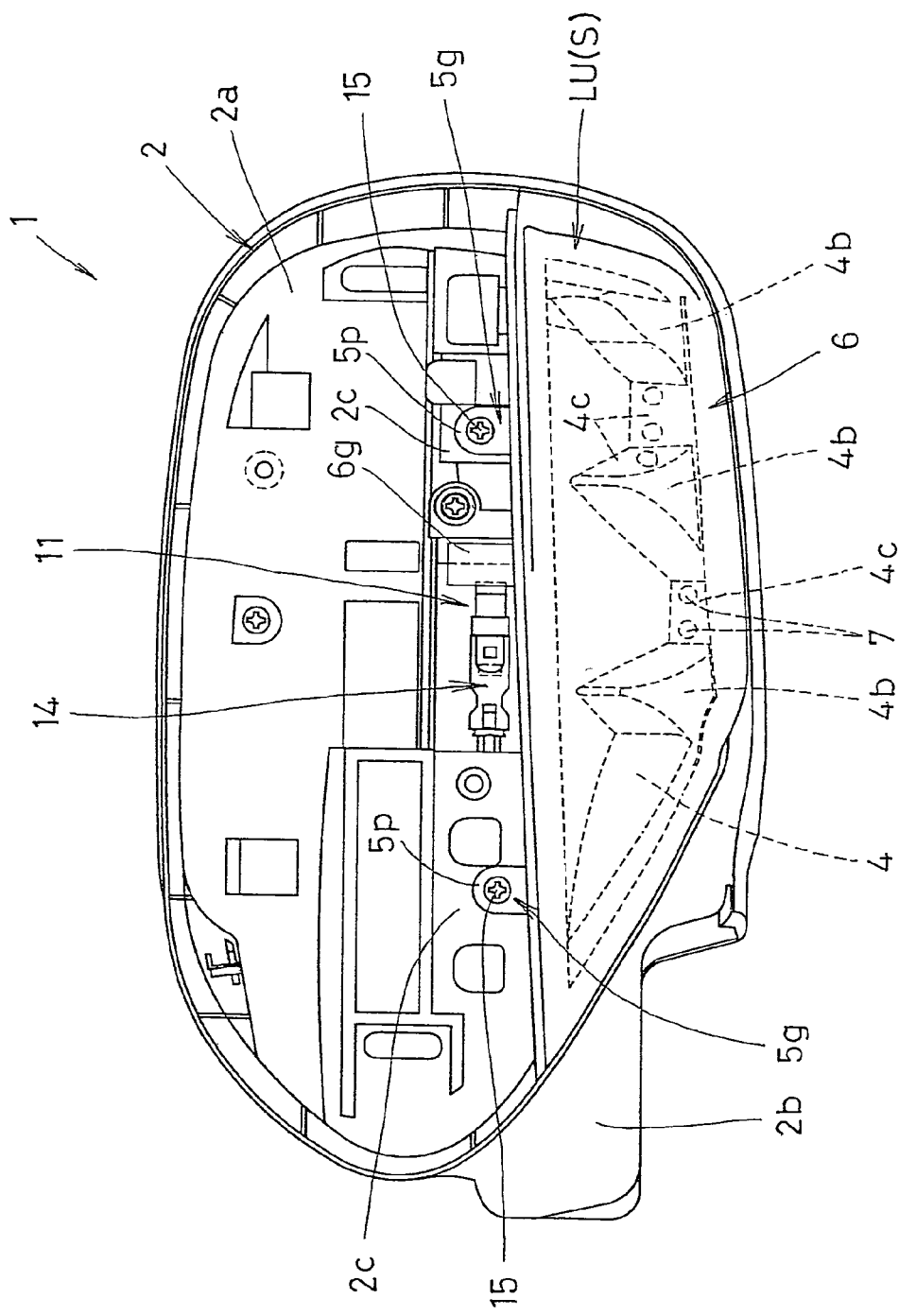
FIG. 11 is a rear view of the door mirror for explaining the lamp unit in a fixed condition.
Figure 12:
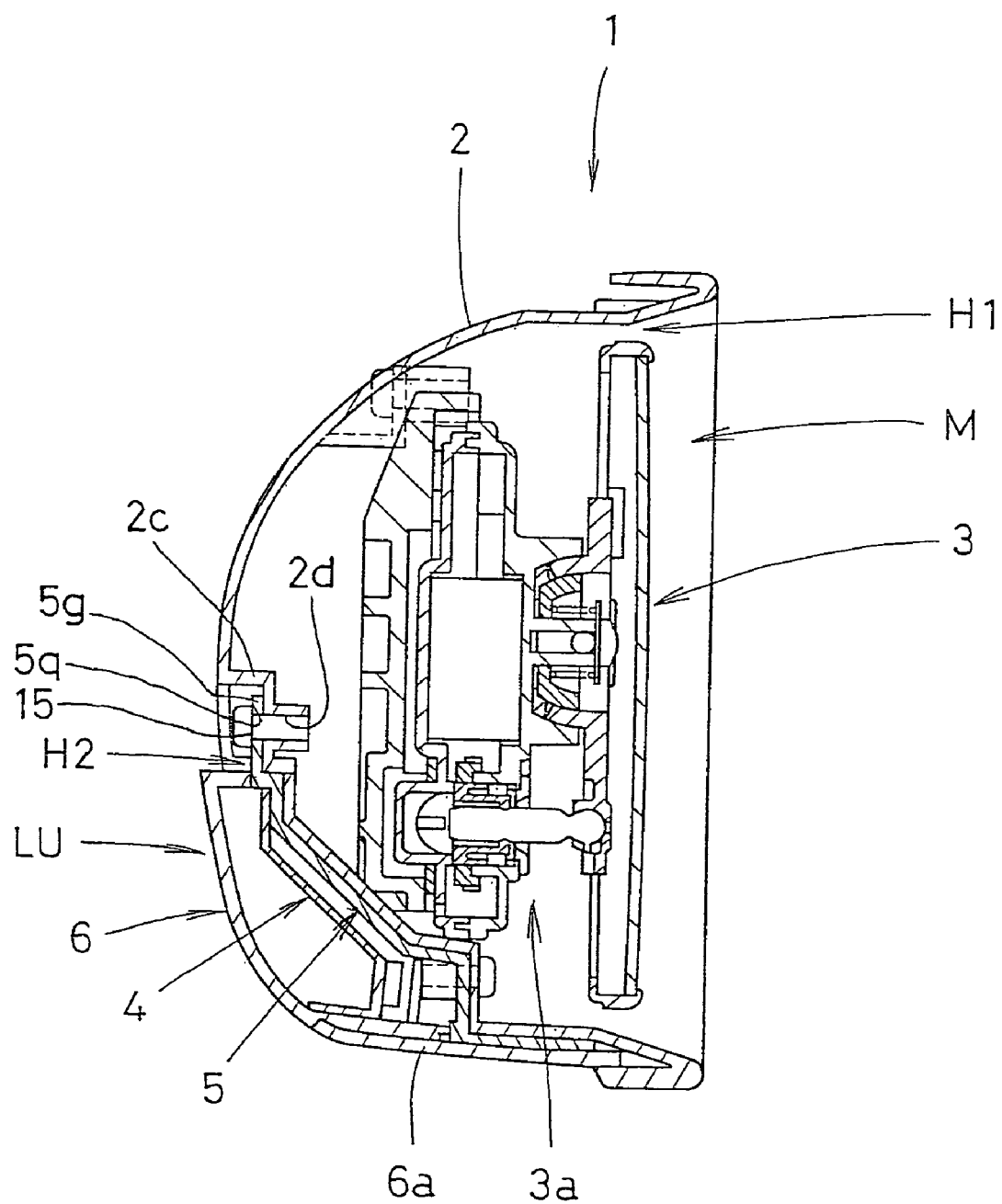
FIG. 12 is a cross-sectional view of the door mirror.

The lamp unit LU thus structured is fixed via the fixing pieces 5*g* to the mirror housing 2, and such fixation is performed as follows (FIGS. 11 and 12). The lamp unit LU is installed to be assembled into the second opening H2 provided at the back face of the mirror housing 2 from its back face side (toward the front of the vehicle), with the lens portion 6 oriented toward the back face side. The fixing pieces 5*g* of the lamp unit LU are abutted against two, left and right, fixing pieces 2*c* formed on the mirror housing 2 to communicate the mounting holes 5*q* provided in the fixing pieces 5*g* with screw holes 2*d* provided on the mirror housing fixing pieces 2*c*, and a screw 15, inserted through the mounting hole 5*q*, is tightened, whereby fixation of the lamp unit LU to the mirror housing 2 is attained.

Figure 2:
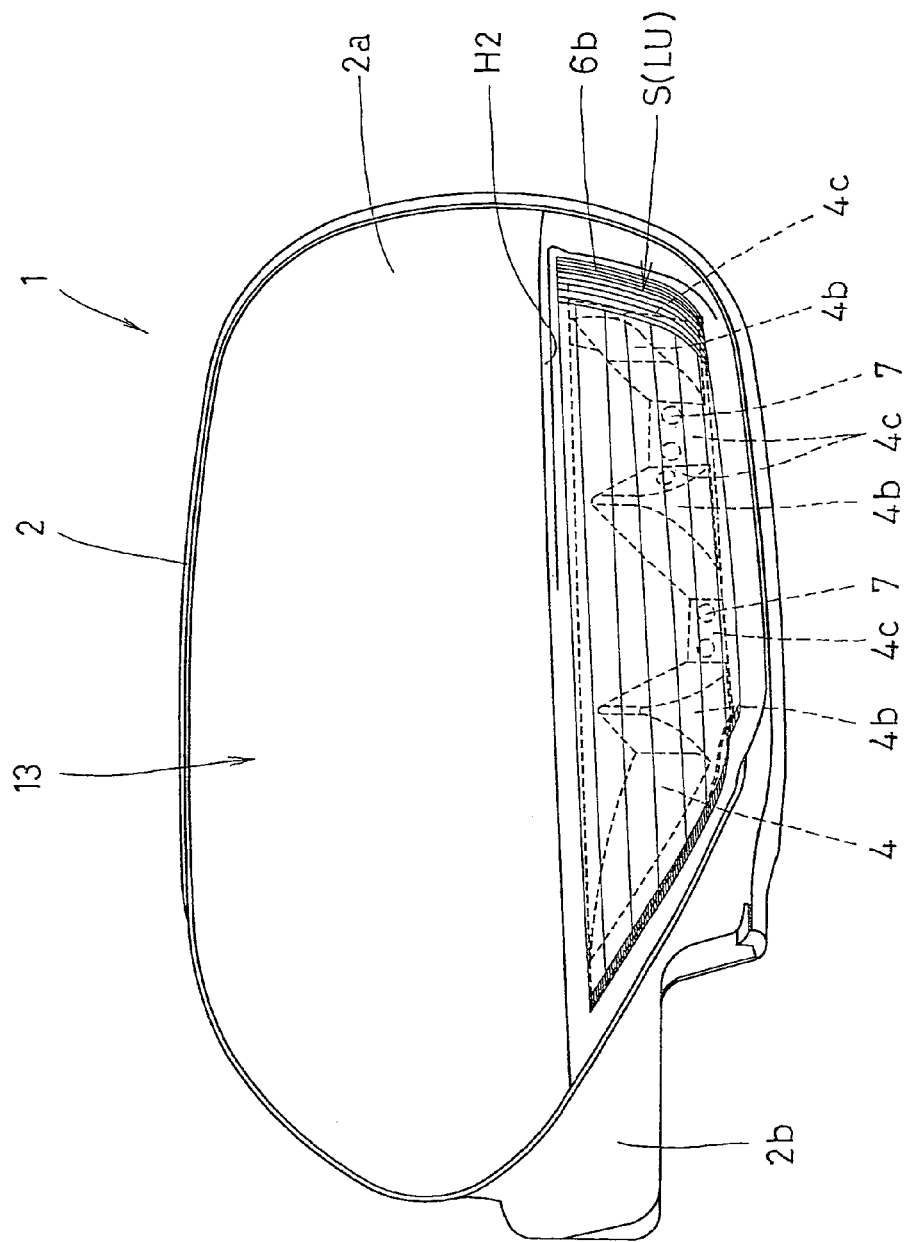
FIG. 2 is a rear view of a door mirror.
Figure 3:
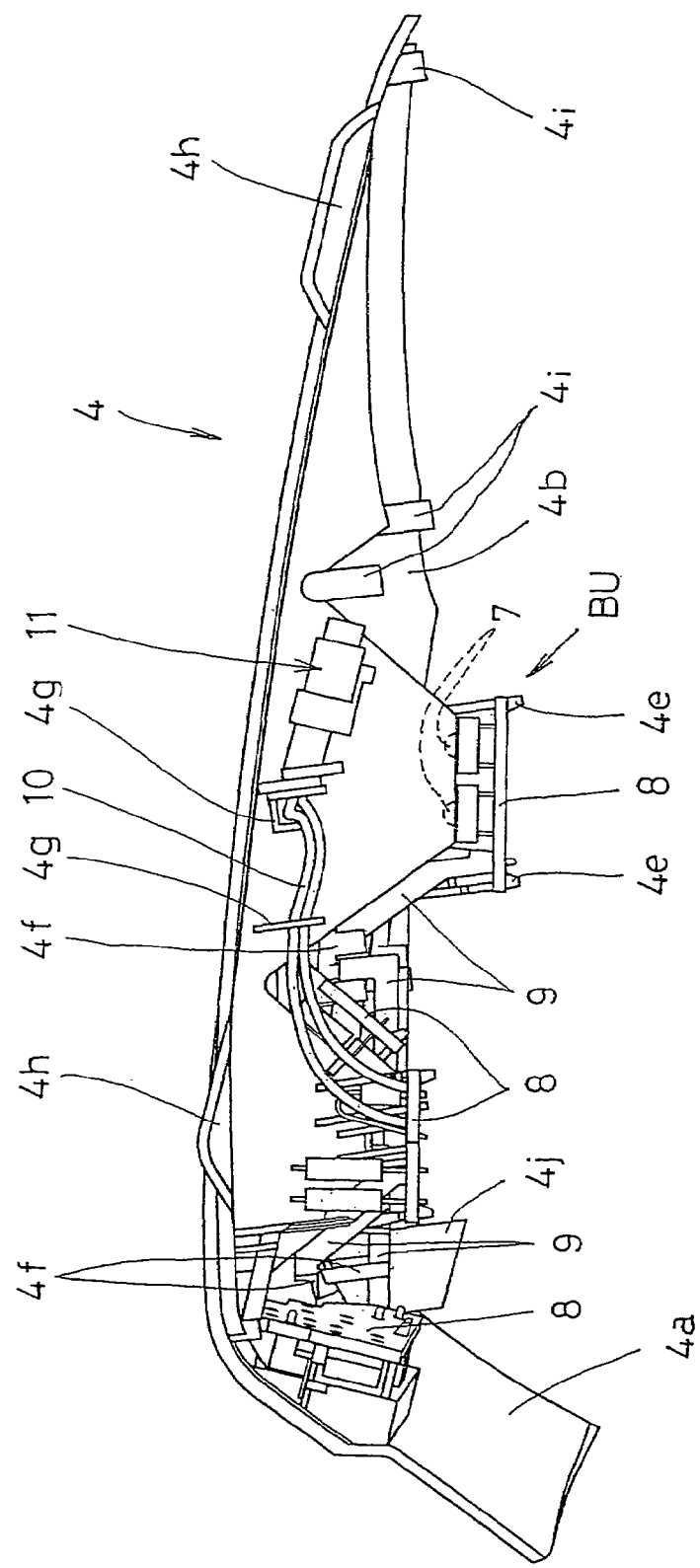
FIG. 3 is a plan view of the inner base.
Figure 4:
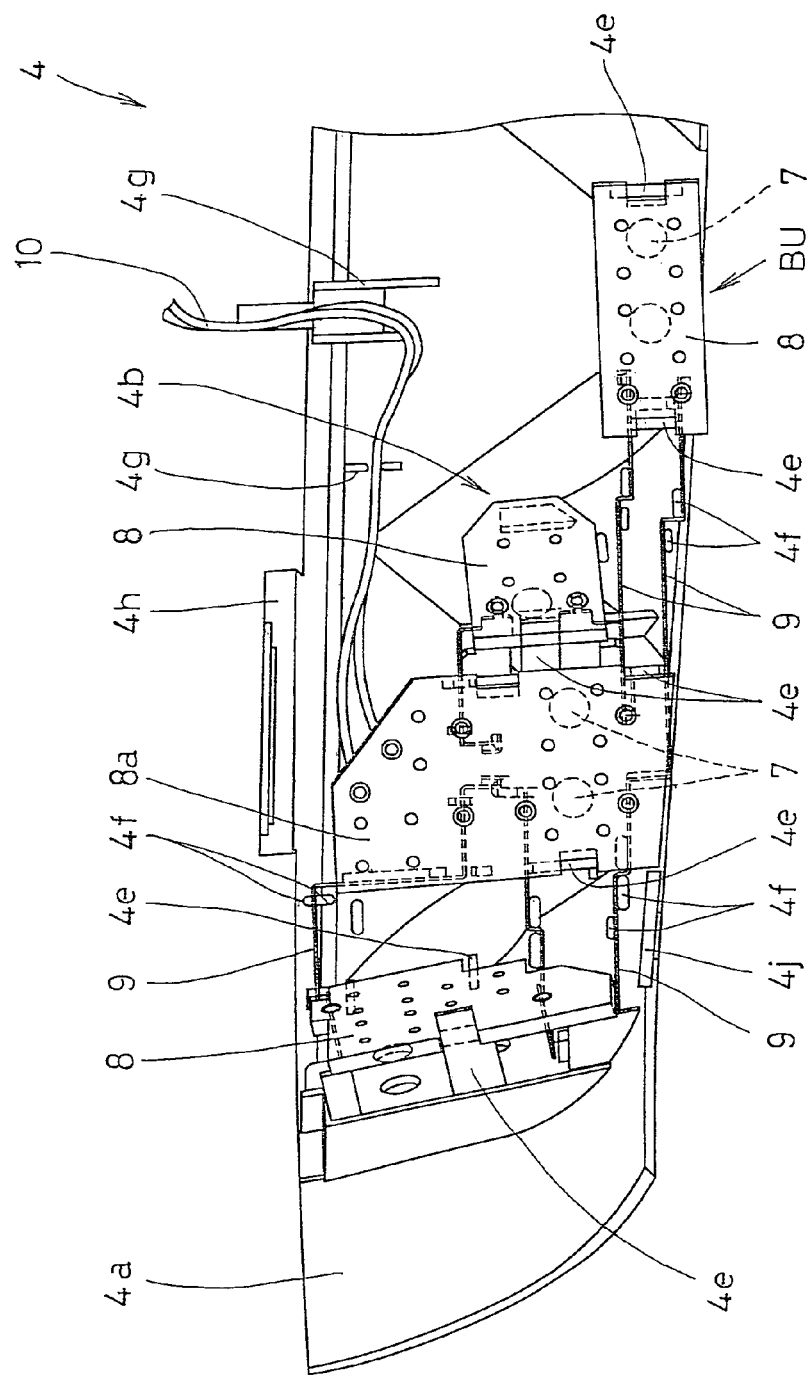
FIG. 4 is a partially enlarged front view of the inner base.
Figure 5:
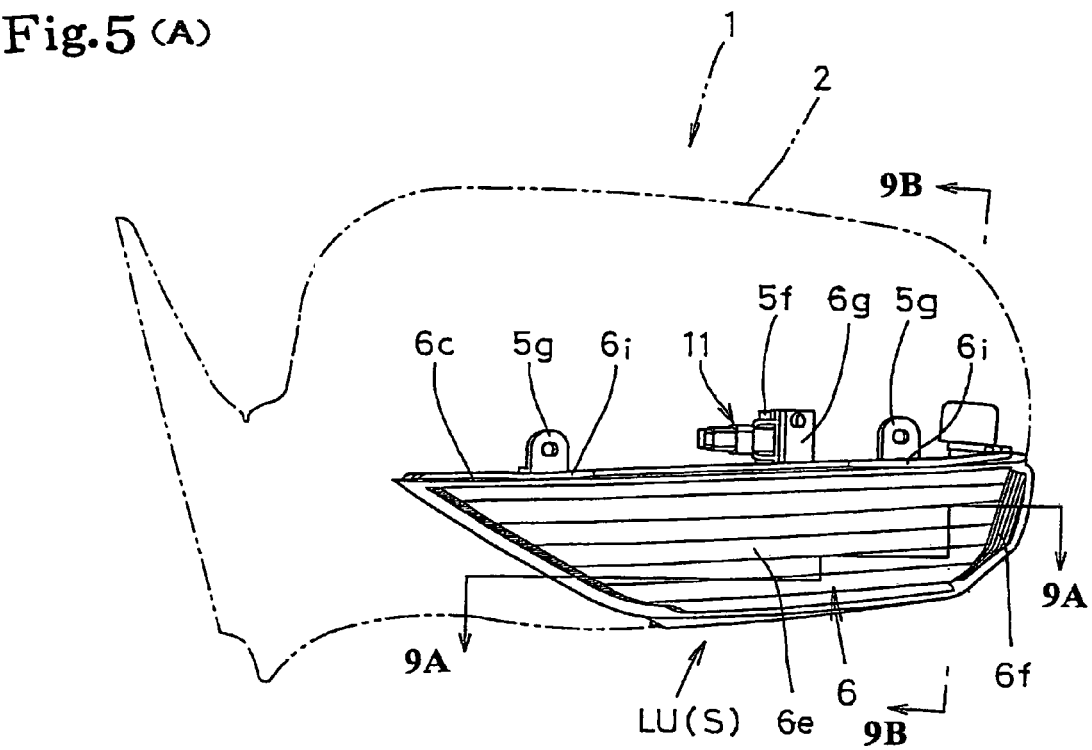
FIGS. 5(A) and 5(B) are respectively rear and front views of the lamp unit.
Figure 5:
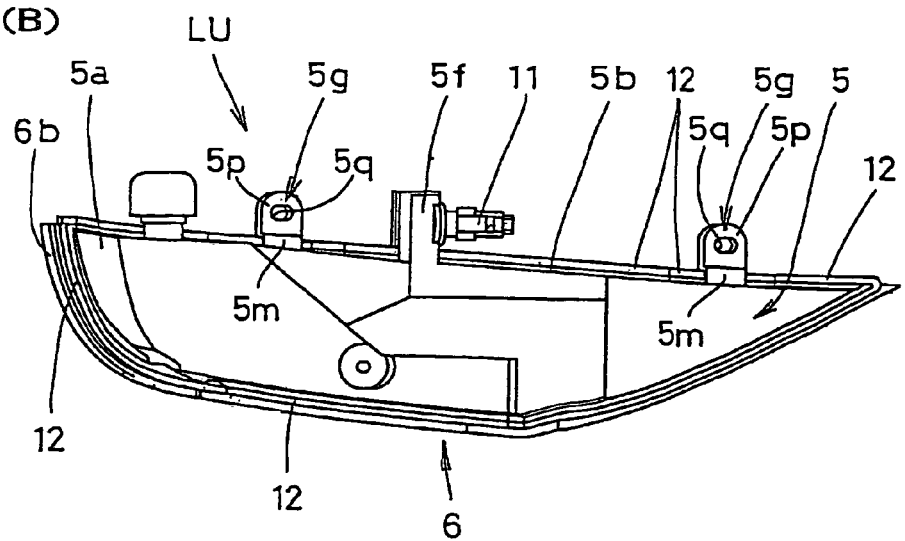

The upper half on the back face side of the mirror housing 2 is covered with a cover 13 (FIG. 2). The cover 13 is formed separately from the lamp unit LU which is disposed at the lower half of the back face side of the mirror housing 2 and is provided in a manner approximately flush with the lens portion 6 of the lamp unit LU so as to cover the fixing pieces 5*g* (corresponding to a fixing portion) of the lamp unit LU positioned closer to the front face side than the lens portion 6.

In the exemplary embodiment thus structured, the side blinker portion S, to be assembled into the door mirror 1, is structured by assembling the lamp unit LU, which is provided by integrally assembling the lens portion 6 into the outer base 5 covering the front face of the inner base 4 on which the boards 8 and terminal strips 9 are disposed, into the mirror housing 2. Therefore, not only is the structure of the door mirror 1 simplified, but also assembling work into the door mirror 1 becomes easy.

Furthermore, in this instance, when the lamp unit LU, which is a side blinker portion S, is assembled into the mirror housing 2, the lamp unit LU is assembled not from the front face side of the mirror housing 2, namely, the side where the mirror M is disposed, but from the back face side, and is fixed by abutting the fixing pieces 5*g* to the mirror housing fixing pieces 2*c* and tightening the screws 15. Consequently, when replacing the lamp unit LU, removing the cover 13 which is formed separately from the lump unit LU leads to the exposure of the fixing pieces 5*g*. With the fixing pieces 5*g* thus exposed, the lamp unit LU is removed in a fixed condition without removing the mirror portion M from the mirror housing 2. Thus, the replacement of the lamp unit LU becomes simple and easy. Moreover an improvement in workability is realized and excellent maintenance features are provided.

In other words, the cover 13 serves as a decorative cover which covers and decorates the back side (toward the front of the vehicle) of the mirror housing 2 and at the same time serves as a cover body for covering a fixing portion with respect to the mirror housing 2 of the side blinker portion S. Moreover when mounting a door mirror 1 to a car body which is different in color from other car bodies the same mirror housings 2 and lamp units LU can be commonly used for all car bodies and only the cover 13 needs to have the same color as that of the car body, thereby realizing common use of parts.

In addition, in the embodiment of the invention, the lamp unit LU is structured by abutting the lens portion 6 against the back face side of the base body having the inner base 4 and outer base 5 and integrating the same using resin material 12 injected therebetween. Therefore, the door mirror is excellent in design characteristics and, moreover, excellent in waterproofing characteristics. Thus, it is unnecessary to consider waterproofing characteristics for the attachment to the mirror housing 2, thus resulting in an improvement in workability. Furthermore, in this instance, because the lamp unit LU is fixed to the mirror housing 2 via the fixing pieces 5*g* mounted on the base body formed with a non-translucent resin material, it is possible to minimize light leakage from the lamp unit LU and provide higher visibility.

Additionally, because on the back face of the mirror housing 2, the cover 13 mounted above the lamp unit LU is formed separately from the lamp unit LU and covers the fixing pieces 5g of the lamp unit LU to prevent exposure to the outside, and moreover, because the cover 13 is approximately flush with the lens portion 6 of the lamp unit LU, excellent design characteristics are provided.

Thus, in a door mirror into which a lamp body, such as a side blinker is inserted, by only replacing a lamp body due to consumption or breakage of the light source(s) of the lamp body, it is possible to easily replace the lamp body with a new one because the fixing portions are exposed by removing a cover which covers the mirror housing.

What is claimed is:

1. A door mirror for a vehicle, comprising:
   a mirror housing having an open side and a swelled opposite side;
   a positionable mirror mounted in the open side;
   a light assembly mounted in the swelled opposite side, wherein the swelled opposite side has an opening for receiving the light assembly, the light assembly comprising;
   an outer base;
   an inner base incorporated into the outer base and provided with light sources; and
   a lens portion abutted against the outer base from a side of the outer base where the inner base is incorporated into the outer base, wherein the lens portion and the outer base are integrated together by filling a resin material in a portion where the lens portion abuts against the outer base; and
   a cover removably mounted to an upper portion of the swelled opposite sides wherein:
   the light assembly is provided with a coupler that is capable of being connected to an external coupler in order to supply electric power to the light sources,
   a base end portion of the coupler is accommodated into a first coupler supporting piece on an outer base side of the light assembly together with a lead wire connected to the light sources,
   the first coupler supporting piece on the outer base side is abutted against a second coupler supporting piece on a lens portion side of the light assembly, and
   the first coupler supporting piece and the second coupler supporting piece are integrated together by filling the resin material in a portion where the first coupler supporting piece abuts against the second coupler supporting piece in order to integrate the lens portion with the outer base.

2. The door mirror according to claim 1, wherein:
   the mirror housing, the light assembly and the cover are separately formed;
   the light assembly is incorporated into the mirror housing in a direction opposite to the mirror; and
   the light assembly is fixed to the mirror housing by abutting fixing portions incorporated into the mirror housing in a direction opposite to the mirror and protruding upward from the outer base against mounting pieces provided on the mirror housing in the direction opposite to the mirror and tightening screws in the direction opposite to the mirror, with the fixing portions being covered by the cover that has been mounted to the mirror housing in the direction opposite to the mirror.

3. The door mirror according to claim 2, wherein:
   the second coupler supporting piece serves as an injection incoming port for injection molding of the lens portion, and
   the second coupler supporting piece is formed in an upwardly protruding fashion and is covered by the cover that has been mounted to the housing in the direction opposite to the mirror portion.

* * * * *